(12) United States Patent
Hashimoto

(10) Patent No.: US 6,370,096 B1
(45) Date of Patent: Apr. 9, 2002

(54) OPTICAL-DISC RECORDING DEVICE WITH EFFICIENT MECHANISM FOR PERFORMING OVERALL ERASING OPERATIONS

(75) Inventor: Hirokuni Hashimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/315,841

(22) Filed: May 21, 1999

(30) Foreign Application Priority Data

Jun. 12, 1998 (JP) ............................................ 10-165355

(51) Int. Cl.$^7$ ................................................. G11B 3/90
(52) U.S. Cl. ........................................ 369/53.2; 369/32
(58) Field of Search ........................... 369/32, 33, 53.2, 369/53.24, 47.12, 47.13, 47.15, 47.31, 83

(56) References Cited

U.S. PATENT DOCUMENTS

| 5,706,271 A | 1/1998 | Hashimoto |
| 6,108,289 A | 8/2000 | Hashimoto |
| 6,172,955 B1 | 1/2001 | Hashimoto |

FOREIGN PATENT DOCUMENTS

EP          0 681 292 A2    8/1995

*Primary Examiner*—Paul W. Huber
(74) *Attorney, Agent, or Firm*—Dickstein Shapiro Morin & Oshinsky LLP

(57) ABSTRACT

An optical-disc recording device records information on and erases information from a re-recordable optical disc. The device is provided with means for, when overall erasing is performed on the optical disc, obtaining, from management information, a position of an area in which information has been recorded, performing an erasing operation on the area, and erasing the management information.

5 Claims, 7 Drawing Sheets

OPTICAL-DISC RECORDING DEVICE WITH EFFICIENT MECHANISM FOR PERFORMING OVERALL ERASING OPERATIONS

BACKGROUND OF THE INVENTION

1. Field of the Invention

The present invention relates to an optical-disc recording device such as a CD-RW drive or the like which performs recording of information on and erasing of information from an optical disc such as a CD-RW or the like on which re-recording of information can be performed.

2. Description of the Related Art

Information is recorded on a compact disc (CD), which is an optical disc, in recording units called sessions. Each session is separated into three areas, i.e., a lead-in area, a program area, and a lead-out area. On the program area, information which a user actually records or reproduces is recorded in recording units called tracks or packets.

In the lead-in area, information of table of contents of tracks (TOC) is recorded.

A manner of recording in which a plurality of sessions such as those described above exist on a single optical disc is referred to as a multi-session recording manner.

Each of an appending-type compact disc (CD-R) and a re-recordable compact disc (CD-RW) has management information, for managing information of tracks, recorded on a predetermined area (Program Memory Area: PMA) thereof, in addition to the above-mentioned TOC.

As a form of the last session, there is a form called an open session in which no information has been recorded on the lead-in area and lead-out area thereof, and a form called a closed session in which information has been recorded on the lead-in area and lead-out area thereof. All the sessions but the last session are closed sessions.

Because no information has been recorded on the lead-in area of the open session, the TOC having information of tracks which belong to that session is not recorded. However, because the PMA exists, the information of the tracks in the open session can be obtained from the PMA.

The CD-RW disc is a disc on which information can be re-recorded, and the recorded information can be erased. There are various ranges to be erased in the re-recordable disc. Nevertheless, overall erasing is performed frequently.

In the related art, there is an optical-disc recording device (for example, see Japanese Laid-Open Patent Application No. 9-288823) which is provided with means for erasing information recorded on a specified area of a re-recordable optical disc such as a CD-RW or the like.

However, in an optical-disc recording device in the related art, in order to perform the overall erasing, i.e., erasing of all the information recorded on an optical disc, an erasing operation is performed over all the recording area of the optical disc from the inner side to the outer side thereof, successively. Thus, the erasing operation is performed also on an unrecorded area, i.e., an area on which no information has been recorded. As a result, an enormous amount of time is required until the overall erasing is finished.

For example, when the overall erasing is performed on an optical disc in a manner such as that described above at a double speed, on which disc 74 minutes of information can be recorded, approximately 40 minutes are required for the overall erasing.

SUMMARY OF THE INVENTION

The present invention has been devised in consideration of the above-mentioned point, and an object of the present invention is to reduce the time required for overall erasing performed on a re-recordable optical disc.

In order to achieve the above-described object, the present invention provides in an optical-disc recording device that records information on and erases information from a re-recordable optical disc means for obtaining, from management information, a position of an area in which information has been recorded, performing an erasing operation on the area, and erasing the management information when overall erasing is performed on the optical disc.

In this arrangement, when the overall erasing is performed on the re-recordable optical disc, the position of each track on which information has been recorded is obtained from the management information in TOC, PMA and so forth, the erasing operation is performed on those tracks, and the management information is erased. Therefore, it is possible to prevent an unnecessary operation such as that of performing the erasing operation on an unrecorded area from being performed. As a result, it is possible to perform the overall erasing on the optical disc in a short time.

It is preferable that means be provided for, when an ending position of the area has not been recorded in the management information, searching from a starting position of the area, finding an ending position of recorded information, and performing the erasing operation from the starting position of the area to the ending position of recorded information.

In this arrangement, in a case in which the last session is the open session, and a track (area) to be processed is an incomplete track (area), only the starting address (starting position) of which has been recorded in the management information and the ending address (ending position) of which has not been recorded in the management information, a searching operation is performed from the starting position of that area, the ending position of the recorded information is found, and the erasing operation is performed from the starting position of the area to the thus-found ending position of the recorded information. Therefore, it is possible to prevent the erasing operation from being performed on an unrecorded area outside of the incomplete track. As a result, it is possible to eliminate unnecessary operation time in the overall erasing.

It is also preferable that means be provided for, when either no information has been recorded on the area or information has been only partially recorded on the area although a starting position and an ending position of the area have been recorded in the management information, searching the area and performing the erasing operation only on a part of the area, on which part the information has been recorded.

In this arrangement, in a case in which a track (area) to be processed is either a reserved track (area), on which no information has been recorded or a partially written track (area), on which information has been only partially recorded, although the starting address (starting position) and the ending address (ending position) of which have been recorded in the management information, searching is performed on the area, and, when information has been found in the area, the erasing operation is performed only on that part of the area on which the found information has been recorded. Therefore, it is possible to prevent the erasing operation from being performed on an information-unrecorded area either in the reserved track or in the partially written track. As a result, it is possible to eliminate unnecessary operation time in the overall erasing.

It is also preferable that means be provided for searching all areas for which the starting positions and ending positions have not been recorded in the management information, and, when information has been found as a result of the searching, performing the erasing operation on an area on which the found information has been recorded.

In this arrangement, all areas for which the starting addresses (starting positions) and ending addresses (ending positions) have not been recorded in the management information, are searched, and, when information has been found as a result of the searching, the erasing operation is performed on the area over which the thus-found information has been recorded. Therefore, it is possible to perform the overall erasing on the optical disc positively, on which disc information has not been recorded correctly.

It is also preferable that means be provided for searching a predetermined area immediately following a last area, a starting position and an ending position of which area have been recorded in the management information, and, when information has been found as a result of the searching, performing the erasing operation on all the recording area of the optical disc.

In this arrangement, a predetermined area immediately following the last area, the starting address (starting position) and the ending address (ending position) of which are recorded in the management information, is searched, and, when information has been found as a result of the searching, the erasing operation is performed on all the recording area of the optical disc. Therefore, it is possible to perform the overall erasing on the optical disc positively, on which disc information has not been recorded correctly.

Thus, by using the optical-disc recording device according to the present invention, it is not necessary to wait for a long time for the overall erasing on the optical disc to finish, which optical disc is an optical disc on which re-recording of data through overwriting can be performed.

Other objects and further features of the present invention will become more apparent from the following detailed description when read in conjunction with the accompanying drawings.

DETAILED DESCRIPTION OF THE PREFERRED EMBODIMENT

An embodiment of the present invention will now be concretely described with reference to the drawings.

Figure 1:
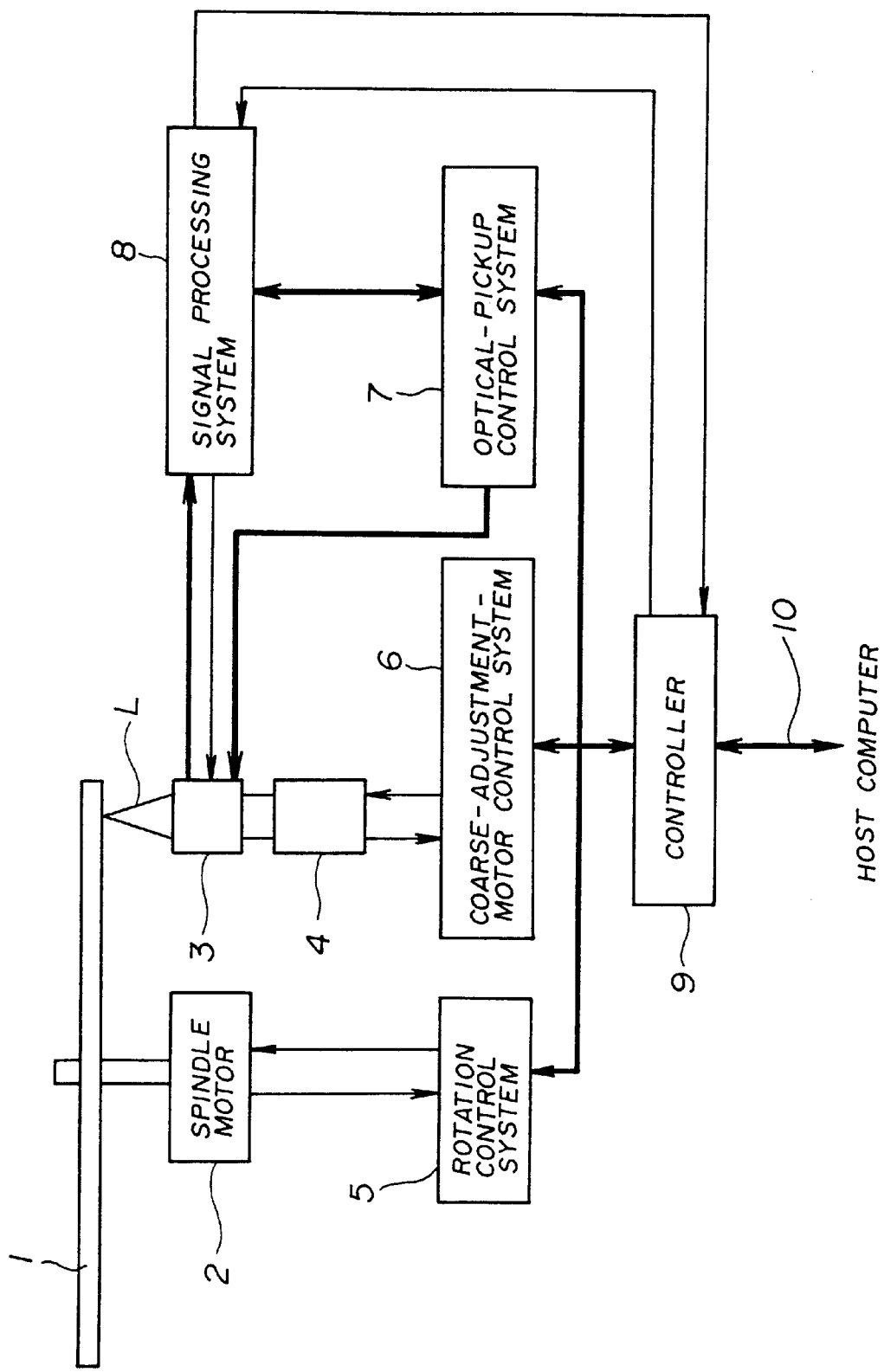
FIG. 1 is a block diagram showing an arrangement of an optical-disc drive in one embodiment of an optical-disc recording device according to the present invention.

FIG. 1 is a block diagram showing an optical-disc drive in the embodiment of an optical-disc recording device according to the present invention.

This optical-disc drive includes a spindle motor 2 which rotates an optical disc 1 such as a CD-RW or the like, an optical pickup 3 which has a semiconductor laser mounted therein and applies laser light L to the recording area of the optical disc 1, and a coarse-adjustment motor 4 which moves the optical pickup 3 in a direction of a radius of the optical disc 1 in cooperation with a seek motor provided in the optical pickup 3.

The optical-disc drive further includes a rotation control system 5, a coarse-adjustment-motor control system 6, an optical-pickup control system 7, a signal processing system 8 and a controller 9. The rotation control system 5 controls rotation of the spindle motor 2. The coarse-adjustment-motor control system 6 controls driving of the coarse-adjustment motor 4. The optical-pickup control system 7 controls the optical pickup 3. The signal processing system 8 transmits and receives a signal of data which has been read from the optical disc 1 through the optical pickup 3 and a signal of data which will be written on the recording area of the optical disc 1 through the optical pickup 3. The controller 9 performs control of the above-mentioned control systems 5, 6, 7 and signal processing system 8, and, also, performs a process of erasing information recorded on the recording area of the optical disc 1 according to the present invention.

Further, the controller 9 is connected with a host computer via an external interface 10. The controller 9 transmits data read from the optical disc 1 to the host computer, and receives data to be written on the optical disc 1 from the host computer.

Further, in the optical-disc drive, the optical pickup 3 is moved in the direction of the radius of the optical disc 1 while the optical disc 1 is rotated by the spindle motor 2, the laser light L emitted from the semiconductor laser is applied to the recording area on the recording surface of the optical disc 1, and data is recorded on the optical disc 1 or data is reproduced from the optical disc 1.

When recording data on the optical disc 1, the optical-disc drive applies the laser light L to the recording area of the optical disc 1 through the optical pickup 3 with recording power, and, thus, records various data on the optical disc 1, under control by the controller 9.

When reproducing data from the optical disc 1, the optical-disc drive applies the laser light L to the recording area of the optical disc 1 through the optical pickup 3 with reproducing power, and, reproduces data recorded on the optical disc 1 based on the reflected light, under control by the controller 9.

When performing the overall erasing on the optical disc 1, the optical-disc drive performs the process of erasing information recorded on the recording area of the optical disc 1 according to the present invention, under control by the controller 9.

Thus, the controller 9 and so forth act as means for recording information on and erasing information from a re-recordable optical disc, and means for, in order to perform the overall erasing on the optical disc, obtaining the position of an area, over which area information has been recorded, based on management information for managing the recording area of the optical disc, performing the erasing operation only on the thus-obtained area so as to erase the information on that area, and erasing the management information.

Further, the controller 9 and so forth act as means for, when the ending-end position of an area over which information has been recorded is not recorded in the management information, searching from the starting-end position of that area, finding the ending-end position of that area, and performing the erasing operation on that area.

Furthermore, the controller 9 and so forth act as means for, when either no information has been recorded in an area or information has been recorded only in a part of an area although the ending-end position and the starting-end position of that area are recorded in the management information, searching that area, and, when information is found as a result of the searching, performing the erasing operation on the part over which the thus-found information has been recorded.

Furthermore, the controller 9 and so forth act as means for searching all the recording area of the optical disc but those areas the starting position and ending position of each of which have been recorded in the management information, and performing the erasing operation on an area, if any, which has been found as a result of the searching, over which area information has been recorded.

Furthermore, the controller 9 and so forth act as means for searching a predetermined area immediately following the last area of areas the starting position and ending position of each of which have been recorded in the management information, and, when information has been found as a result of the searching, performing the erasing operation over all the recording area of the optical disc.

A process of the overall erasing performed on the optical disc 1 by the optical-disc drive in the embodiment of the present invention will now be described.

Figure 2A:
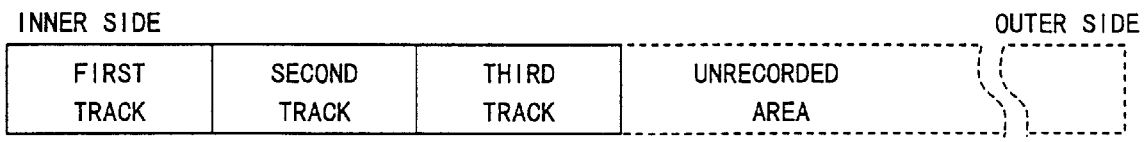
FIGS. 2A and 2B show an example of a format of the recording area of an optical disc for illustrating an outline of the overall erasing performed by the optical-disc drive shown in FIG. 1.
Figure 2B:
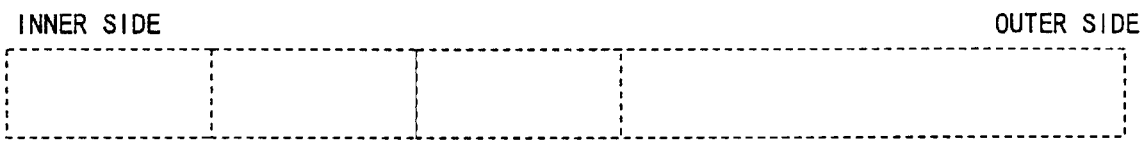

FIGS. 2A and 2B show an example of a format of the recording area of the optical disc 1 for illustrating an outline of the overall erasing.

In a case where, as shown in FIG. 2A, first, second and third tracks of information are recorded in the recording area of the optical disc 1, and an unrecorded area exists on the outer side of those tracks, the management information for managing the respective first, second and third tracks is recorded in the TOC and PMA on the optical disc 1. The starting address and the ending address of each of those tracks are recorded in the PMA. The TOC is recorded in the lead-in area.

When the overall erasing is performed on this optical disc 1, the above-mentioned TOC and PMA are searched, the positions of the first, second and third tracks are obtained, and the erasing operation is performed only on the first, second and third tracks on which information has been recorded so that the information is erased. Then, the management information in the PMA, lead-in area, lead-out area and so forth is erased.

Thus, as shown in FIG. 2B, it is possible to perform the overall erasing, without performing the erasing operation on the unrecorded area on the optical disc 1.

Figure 3:
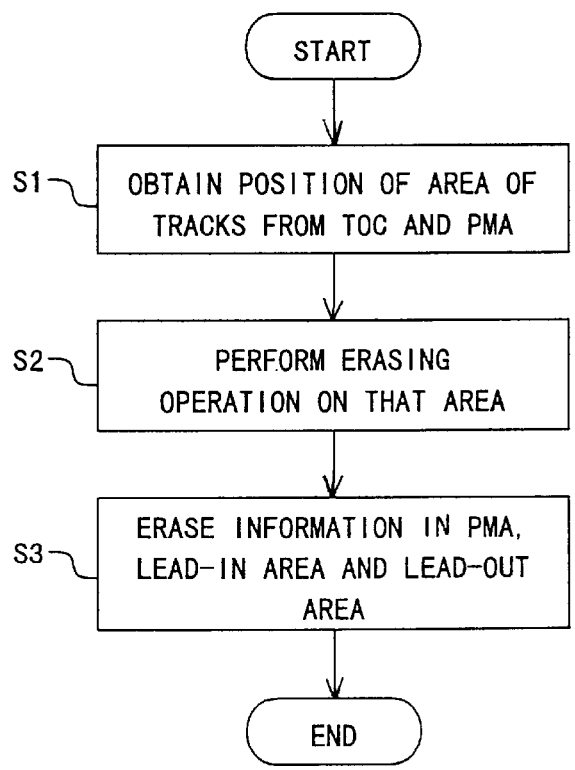
FIG. 3 is a flow chart showing the process of overall erasing performed on the optical disc by the optical-disc drive shown in FIG. 1.

FIG. 3 is a flow chart showing the process of overall erasing performed on the optical disc 1 by the optical-disc drive.

In order to perform the overall erasing on the optical disc 1, the controller 9 obtains, from the management information in the TOC and PMA, the positions of tracks in which information has been recorded, in a step S1, proceeds to a step S2 and performs the erasing operation on those tracks so as to erase the information of those tracks, proceeds to a step S3 and erases the management information in the PMA, lead-in area, lead-out area and so forth, and finishes this process.

In the above-described process, it is also possible that, after the management information in the PMA, lead-in area, lead-out area and so forth is erased, the erasing operation is performed on the tracks so that the information recorded on the tracks is erased, the positions of the tracks having been obtained from that management information.

Thus, in order to perform the overall erasing on the optical disc 1, the positions of the tracks are obtained from the management information in the TOC and PMA, and the erasing operation is performed on those tracks so that the information recorded in those tracks is erased, and, also, the management information for managing the tracks in the lead-in area, lead-out area and PMA is erased. In this process, the erasing operation is not performed on the unrecorded area. Thereby, the time required for the overall erasing can be reduced.

For example, in a case where 20 minutes of information have been recorded in the recording area of an optical disc on which 74 minutes of information can be recorded, approximately 40 minutes are required for the process of overall erasing in the related art. In contrast to this, in the same case, only approximately 10 minutes are required for the process of overall erasing, described above, in which process the erasing operation is performed only on those tracks on which the information has been recorded so that the recorded information is erased and the management information for managing the tracks is erased.

There is a case in which, when the last session of the recording area of the optical disc 1 is the open session, the last track in the last session is in a form called an incomplete track.

The incomplete track is a track the starting address of which has been fixed but the ending address of which has not yet been fixed. In the PMA, the starting address of that track is recorded but the ending address of the track is not recorded.

When the information recorded in such an incomplete track is erased, because the ending address could not be obtained from the management information, the erasing operation would ordinarily be performed also on the unrecorded area.

However, an area in a track, information having been recorded over that area, is continuous in accordance with the specifications of CD. Therefore, the ending position of that area over which the information has been recorded can be easily obtained as a result of the track being searched. As a result, it is possible that the erasing operation is performed only on an area in the incomplete track, the information having been recorded over the area. This area starts at the starting position of the incomplete track and ends at a recording end position, the information having been recorded from the starting position of the incomplete track to the recording end position.

Figure 4:
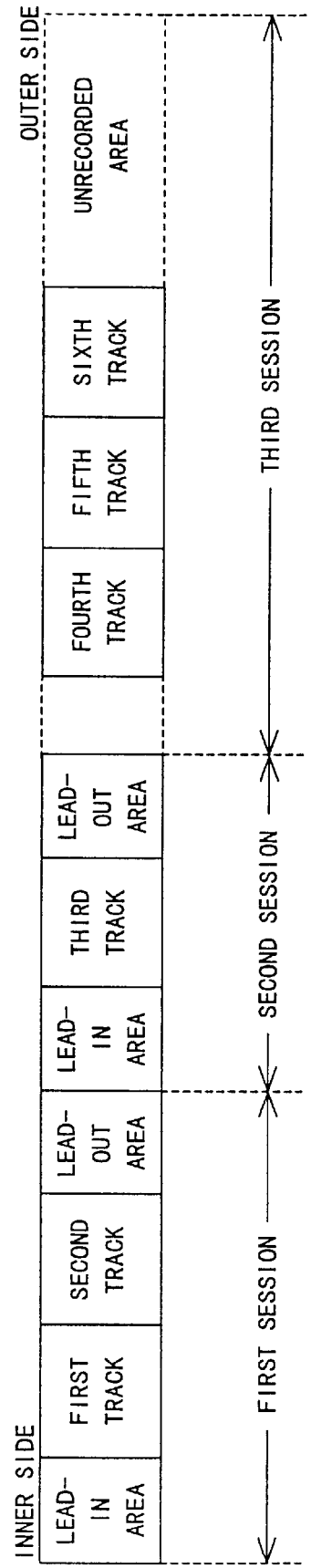
FIG. 4 illustrates an open session, a closed session and an incomplete track in the recording area of the optical disc shown in FIG. 1.

FIG. 4 illustrates the open session, closed session and incomplete track in the recording area of the optical disc 1.

In the figure, each of the first session and the second session is the closed session. Information has been recorded on the lead-in area and information has been recorded on the lead-out area of each of the first and second sessions.

The third session is the open session. No information has been recorded on the lead-in area and no information has been recorded on the lead-out area of the third session.

The management information for managing the first, second and third tracks of the first and second sessions has been recorded in the PMA and TOC. However, because no information has been recorded on the lead-in area of the third session, the TOC for the fourth, fifth and sixth tracks of the third session has not been recorded. Nevertheless, the information for those tracks has been recorded in the PMA.

Assuming that the sixth track is the incomplete track, the ending address of the sixth track is not recorded in the PMA and has not been fixed yet. The area in the incomplete track, the information having been recorded in that area, is continuous in accordance with the specifications of CD.

Figure 5:
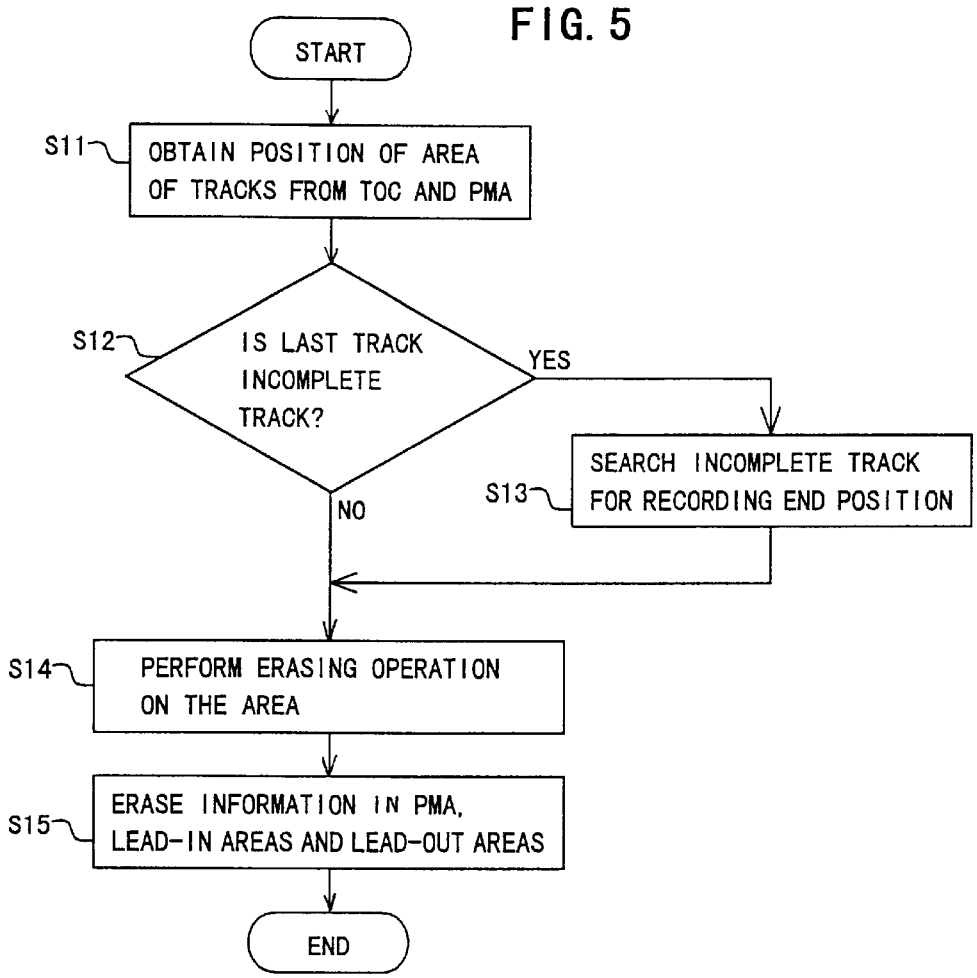
FIG. 5 is a flow chart indicating the process of overall erasing performed by the optical-disc drive shown in FIG. 1 on the optical disc having the incomplete track.

FIG. 5 is a flow chart showing the process of overall erasing performed on the optical disc 1, which has the incomplete track, by the optical-disc drive.

In order to perform the overall erasing on the optical disc 1, the controller 9 obtains the positions of the tracks, in which information has been recorded, from the management information in the TOC and PMA, in a step S11, proceeds to a step S12 and determines whether or not the last track of those tracks is the incomplete track.

When the result of the determination in the step S12 is that the last track is the incomplete track, the controller 9 proceeds to a step S13, performs a searching operation from the starting position of the incomplete track so as to find the recording end position, information having been recorded from the starting position of the incomplete track to that recording end position. Then, the controller 9 proceeds to a step S14 and performs the erase operation on all the tracks but the incomplete track and on the area, which starts at the starting position of the incomplete track and ends at that recording end position, so as to erase the information recorded on those tracks. Then, the controller 9 proceeds to a step S15 and erases the management information in the PMA, lead-in areas, lead-out areas and so forth, and finishes this process.

In the above-described process, it is also possible that, after the management information in the PMA, lead-in areas, lead-out areas and so forth is erased, the erase operation is performed on all the tracks but the incomplete track and on the area, which starts at the starting position of the incomplete track and ends at the recording end position, so that the information recorded on those tracks is erased.

Thus, in the case where the last track is the incomplete track when the overall erasing is performed on the optical disc 1, the position of the recording end position is obtained as a result of the searching operation being performed from the starting position of the incomplete track, the information having been recorded from the starting position of the incomplete track to that recording end position. The positions of all the tracks but the incomplete track are obtained from the management information in the TOC and PMA. Then, the erasing operation is performed on all the tracks but the incomplete track and on the area, which starts at the starting position of the incomplete track and ends at that recording end position, so that the information recorded on those tracks is erased. Then, the management information for managing those tracks in the PMA, lead-in areas, lead-out areas and so forth is erased.

Accordingly, the erasing operation is not performed on the unrecorded area following the incomplete track. As a result, the time required for the overall erasing can be reduced.

There is a case in which, when the last session of the optical disc 1 is the open session, this session includes a track which is in a form called a reserved track or in a form called a partially written track.

The reserved track is a track, information for which has been recorded in the PMA, and there is a case where information called pre-gap is recorded at the top of this track. The pre-gap is used for recording a track attribute thereon.

The partially written track is a track, information for which has been recorded in the PMA, and on which information has been partially recorded. The area over which the information has been recorded is continuous in accordance with the specifications of CD. The ending position of this area can be easily obtained as a result of the track being searched.

If the erasing operation were performed over the reserved track, because no information has been recorded on that track or only the pre-gap has been recorded at the top of the track although information for the track has been recorded in the PMA, an unnecessary operation would be performed, i.e., the erasing operation would be performed on the unrecorded area.

If the erasing operation were performed over the partially written track, because information has been only partially recorded on that track although information for the track has been recorded in the PMA, a vain operation would be performed, i.e., the erasing operation would be performed on the unrecorded area.

In order to avoid performing such a vain operation, the erasing operation is performed only on an area of the reserved track or the partially written track, information having been recorded over the area. The erasing operation is not performed on the reserved track, when no information has been recorded on the track. Thereby, the erasing operation is not performed on the unrecorded area. As a result, the time required for the overall erasing can be reduced.

Figure 6A:
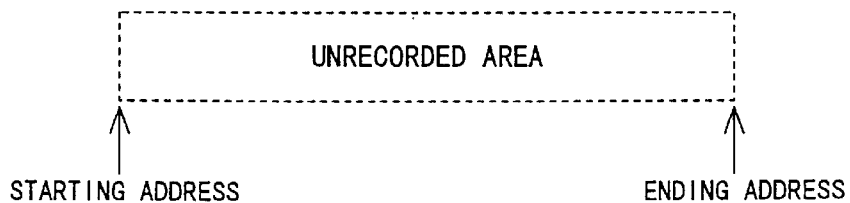
FIGS. 6A and 6B illustrate a reserved track and a partially written track in the recording area of the optical disc shown in FIG. 1.
Figure 6B:
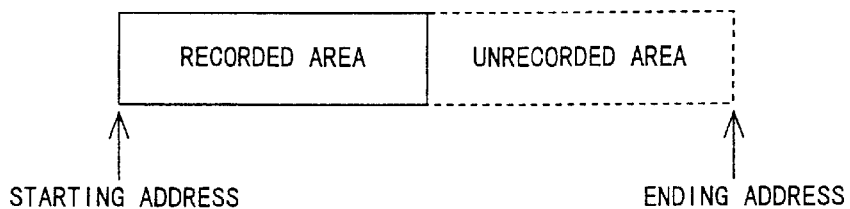

FIG. 6A illustrates the reserved track, and FIG. 6B illustrates the partially written track.

The starting address and the ending address of the reserved track have been recorded in the PMA. No information has been recorded in the reserved track, as shown in FIG. 6A, or only the above-mentioned pre-gap has been recorded at the top of the track.

The starting address and the ending address of the partially written track have been recorded in the PMA. Information has been only partially recorded on the partially written track, as shown in FIG. 6B. The area over which the information has been recorded (recorded area) is continuous in accordance with the specifications of CD, and the remaining area is the unrecorded area.

Figure 7:
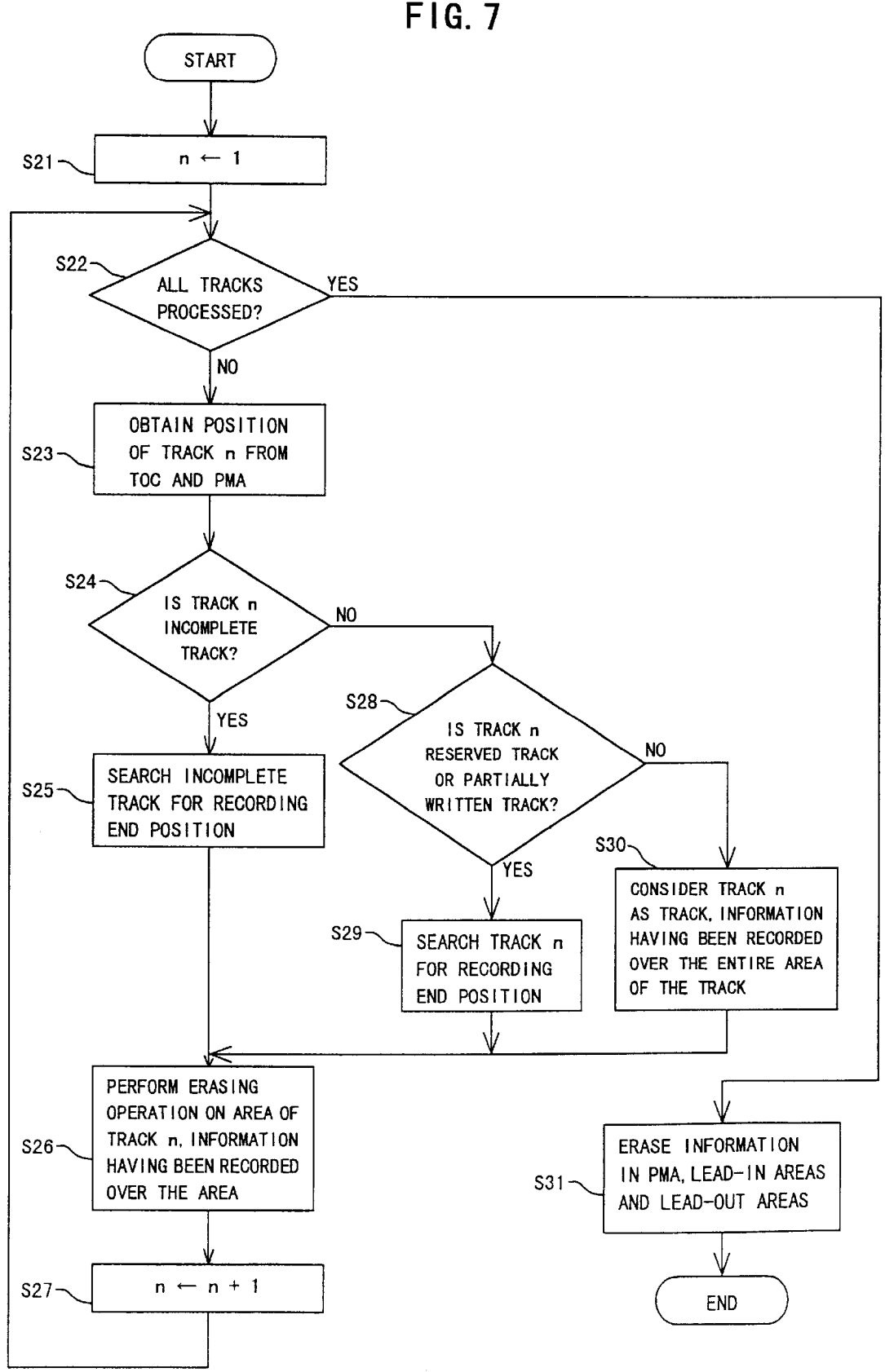
FIG. 7 is a flow chart indicating the process of overall erasing performed by the optical-disc drive shown in FIG. 1 on the optical disc having the incomplete track, reserved track, and/or partially written track.

FIG. 7 is a flow chart showing the process of overall erasing performed on the optical disc 1, having the reserved track, partially written track and/or incomplete track, by the optical-disc drive.

In order to perform the overall erasing on the optical disc 1, the controller 9 sets an initial value n for counting tracks so that n=1 in a step S21. Then the controller 9 proceeds to a step S22 and determines whether or not all the tracks of the recording area of the optical disc 1 have been processed. When having determined in the step S22 that all the tracks have not been processed, the controller 9 proceeds to a step S23 and obtains the position of the track n from the management information in the TOC and PMA. Then, the controller 9 proceeds to a step S24 and determines whether or not the track n is the incomplete track.

When having determined in the step S24 that the track n is the incomplete track, the controller 9 proceeds to a step S25, performs a searching operation from the starting position of the incomplete track so as to find the recording end position, information having been recorded from the starting position of the incomplete track to that recording end position. Then, the controller 9 proceeds to a step S26 and performs the erasing operation on the area, which area starts at the staring end of the incomplete track and ends at the above-mentioned recording end position, so as to erase the information recorded on that area. Then, the controller 9 proceeds to a step S27 and adds 1 to n. Then, the controller 9 returns to the step 22 so as to process the subsequent track.

When having determined in the step S24 that the track n is not the incomplete track, the controller 9 proceeds to a step S28 and determines whether or not the track n is either the reserved track or the partially written track. When having determined in the step S28 that the track n is either the reserved track or the partially written track, the controller 9 proceeds to a step S29, performs a searching operation from the starting position of the track n so as to find out the recording end position, information having been recorded from the starting position of the track n to that recording end position. Then, the controller 9 proceeds to the step S26 and performs the erasing operation on the area, which area starts at the staring end of the track n and ends at the above-mentioned recording end position, so as to erase the information recorded in that area of the track n which is either the reserved track or the partially written track. Then, the controller 9 proceeds to the step S27 and adds 1 to n. Then, the controller 9 returns to the step 22 so as to process the subsequent track. When the track n is the reserved track and also no information has been recorded in the track, the erasing operation is not performed on the track n in the step S26.

When having determined in the step S28 that the track n is neither the reserved track nor the partially written track, the controller 9 considers in a step S30 the track n as a track in which information has been recorded over the entire area of the track. Then the controller 9 proceeds to the step S26, performs the erasing operation on the entire area of the track n so as to erase the information recorded in that area. Then, the controller 9 proceeds to the step S27 and adds 1 to n. Then, the controller 9 returns to the step 22 so as to process the subsequent track.

When having determined in the step 22 that all the tracks in the recording area of the optical disc 1 have been processed, the controller 9 proceeds to a step S31, erases the management information in the PMA, lead-in areas, lead-out areas and so forth, and finishes this process.

In the above-described process, the tracks are processed in the increasing order of the numbers n of the tracks. However, it is not necessary to process the tracks in this order. It is also possible that the tracks are processed in the decreasing order of the numbers n of the tracks.

Further, it is also possible that, after the management information in the PMA, lead-in areas, lead-out areas and so forth is erased, the information recorded in the tracks, the positions of which tracks have been obtained from the management information, is erased.

Thus, when the reserved track or the partially written track is processed, the erasing operation is performed only on a part of that track, over which part information has been recorded. When no information has been recorded on the reserved track, the erasing operation is not performed on that track. Thereby, it is possible to prevent the erasing operation from being performed on the unrecorded area. As a result, it is possible to reduce the time required for the overall erasing.

When the position of a track is obtained from the management information in the TOC and PMA of the optical disc 1, and the erasing operation is performed on a part of the track, over which part information has been recorded, as described above, the overall erasing is properly performed in a case where the optical disc 1 is a correct disc and the management information and so forth has been correctly recorded.

However, in a case in which the optical disc 1 is a wrong disc and the management information and so forth has not been correctly recorded, for example, in a case where information has been recorded outside of the area which is managed by the management information in the TOC and PMA, that information is left unerased. As a result, the overall erasing is not properly performed.

In order to eliminate such a problematic situation, the area outside of the area which is managed by TOC and PMA is searched, and, when recorded information is found as a result of the searching, the erasing operation is performed on the area over which that information has been recorded. Thereby, the overall erasing is performed properly.

Figure 8:
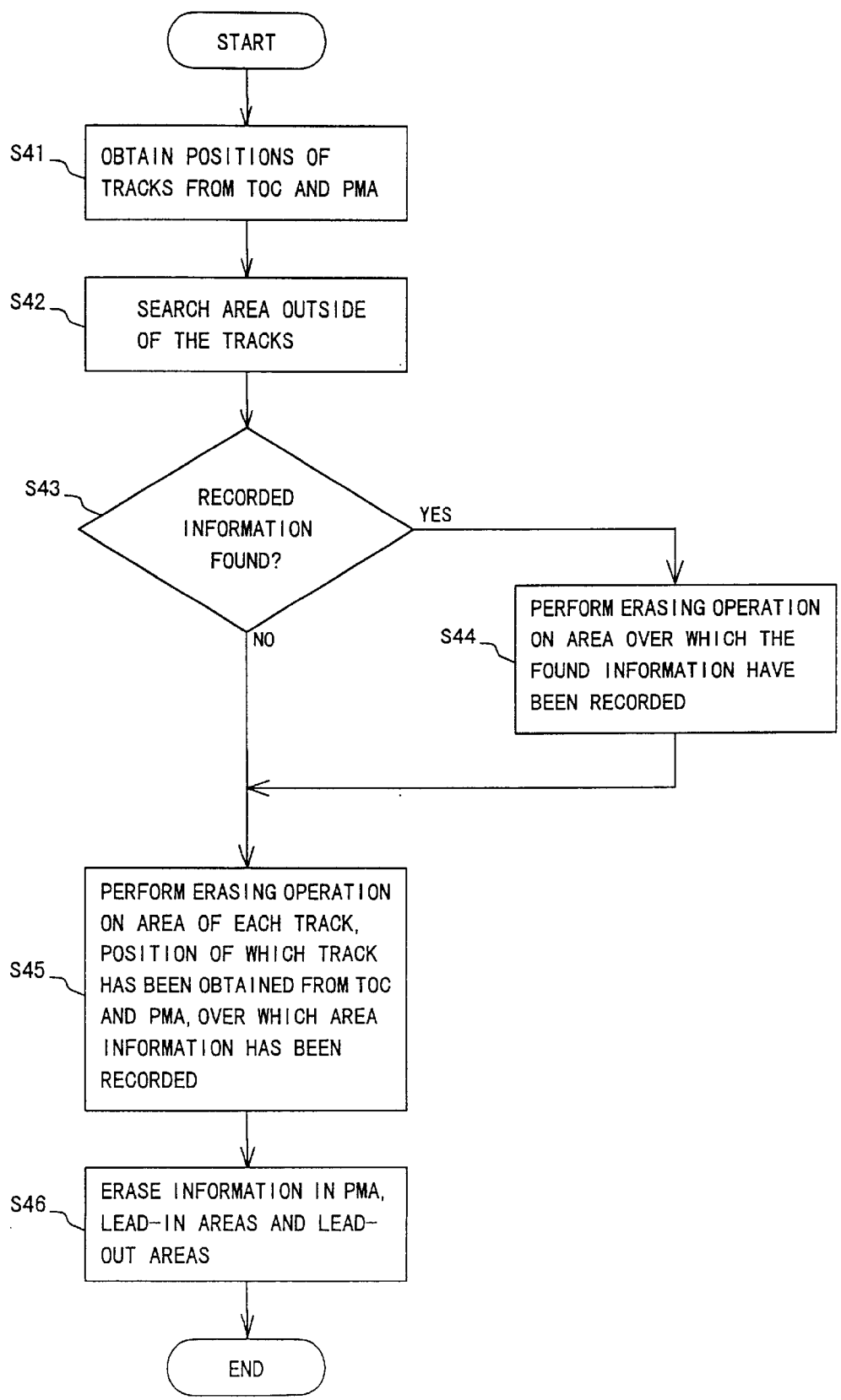
FIG. 8 is a flow chart indicating the process of overall erasing performed by the optical-disc drive shown in FIG. 1 on the optical disc in which information has been recorded also outside of the managed area.

FIG. 8 is a flow chart showing the process of overall erasing performed on the optical disc by the optical-disc drive in a case in which information has been recorded outside of the area which is managed by the management information in the TOC and PMA.

In order to perform the overall erasing on the optical disc 1, the controller 9 obtains, from the management information in the TOC and PMA, the positions of tracks in which information has been recorded, in a step S41. Then, the controller 9 proceeds to a step S42 and searches the area outside of the tracks, the positions of which tracks have been obtained in the step S41. Then, the controller 9 proceeds to a step S43 and determines whether or not recorded information has been found as a result of the searching in the step S42.

When having determined in the step S43 that recorded information has been found, the controller 9 proceeds to a step S44 and performs the erasing operation on the area over which the found information has been recorded so as to erase that information. Thus, through the steps S42, S43 and S44, all the areas but those areas the starting position and the ending position of each of which have been recorded in the management information are searched, and the erasing operation is performed on an area over which information found as a result of the searching has been recorded.

Then, the controller 9 proceeds to a step S45, and performs the erasing operation on the area of each track, the position of which area has been obtained from the management information in the TOC and PMA in the step S41, and over which area the information has been recorded, so as to erase that information. Then, the controller 9 proceeds to a step S46, erases the management information in the PMA, lead-in areas, lead-out areas and so forth, and finishes this process.

In the above-described process, it is also possible that, after the management information in the PMA, lead-in areas, lead-out areas and so forth is erased, the information recorded outside of the area managed by the management information is erased, and the information recorded in that area is erased.

Thus, when the overall erasing is performed on the optical disc 1, the area outside of the area managed by the management information in the TOC and PMA is searched, and, when information is found as a result of the searching, the erasing operation is performed on the area over which the found information has been recorded. Thereby, even if information is not correctly recorded on the optical disc 1, it is possible to prevent any failure to erase such information. As a result, the overall erasing can be performed positively.

In the above-described method in which the area outside of the area managed by the management information in the TOC and PMA is searched, and, when information has been found as a result of the searching, the erasing operation is performed on the area over which the found information has been recorded, both the process of searching and the process of performing the erasing operation are needed. Therefore, a long time is required for the overall erasing.

In particular, a case in which information has been recorded immediately outside of the area managed by the management information in the TOC and PMA will now be considered. In such a case, that information has been recorded over a lengthy area from the position immediately outside of the area managed by the management information in the TOC and PMA, in many cases. A case where, as in the related art (for example, see Japanese Laid-Open Patent Application No. 9-288823), only the information in the first TOC, pre-gap and PMA is erased so that all the information is apparently erased although information in tracks is left unerased will now be considered. In this case, when information is newly recorded, in a case where the amount of such newly recorded information is smaller than the amount of information left unerased as mentioned above, a part of the above-mentioned information left unerased exists immediately outside of the area managed by the management information in the TOC and PMA, over which area the information has been newly recorded.

Therefore, when the overall erasing is performed on the optical disc 1, a predetermined area following the last area managed by the management information is searched. Then, when information has been found as a result of the searching, the erasing operation is performed over all the recording area of the optical disc 1. As a result, in a case where information is not correctly recorded, the overall erasing can be positively performed.

Figure 9:
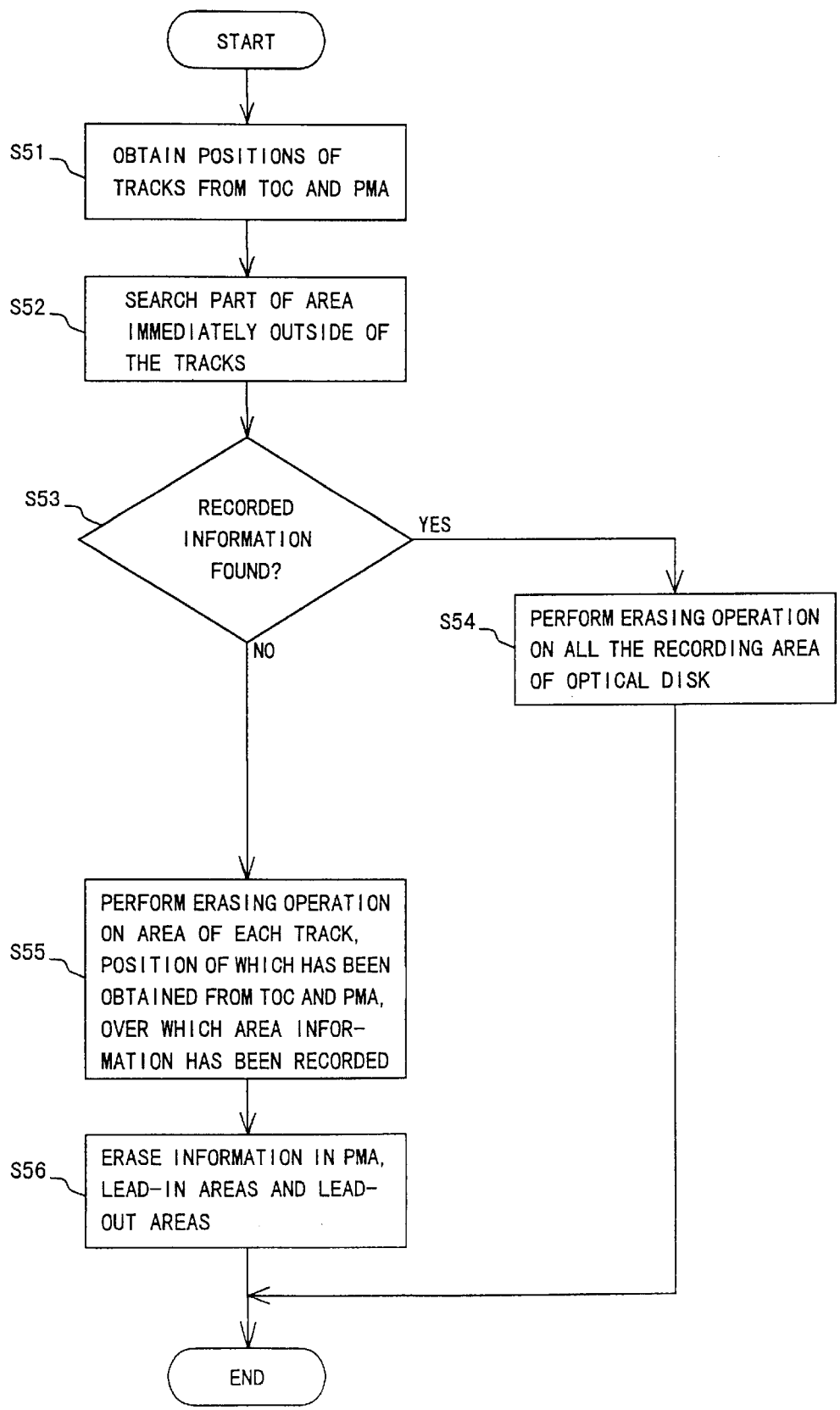
FIG. 9 is a flow chart indicating the process of overall erasing performed by the optical-disc drive shown in FIG. 1 on the optical disc in which information has been recorded on a predetermined area outside of the managed area.

FIG. 9 is a flow chart showing the process of overall erasing performed by the optical-disc drive on the optical disc on which information has been recorded in a predetermined area outside of a managed area.

In order to perform the overall erasing on the optical disc 1, the controller 9 obtains, from the management information in the TOC and PMA, the position of each track in which information has been recorded, in a step S51. Then, the controller 9 proceeds to a step S52 and searches a part of a previously set predetermined area immediately outside of the tracks, the position of each of which has been obtained in the step S51. Then, the controller 1 proceeds to a step S53 and determines whether or not recorded information has been found as a result of the search being performed in the step S52.

When having determined in the step S53 that recorded information has been found, the controller 9 proceeds to a step S54, performs the erasing operation over all the recording area of the optical disc, and finishes this process.

When having determined in the step S53 that no recorded information has been found, the controller 9 proceeds to a step S55, and performs the erasing operation on the area of each track, the position of which area has been obtained from the management information in the TOC and PMA in the step S41, and over which area the information has been recorded, so as to erase that information. Then, the controller 9 proceeds to a step S56, erases the management information in the PMA, lead-in areas, lead-out areas and so forth, and finishes this process.

Thus, when the overall erasing is performed on the optical disc 1, a part of an area immediately outside of an area managed by the management information in the TOC and PMA is searched, and, when information has been recorded in the thus-searched part, the erasing operation is performed over all the recording area of the optical disc 1. Therefore, when information has not been correctly recorded on the optical disc 1, the overall erasing can be performed positively.

The present invention is not limited to the above-described embodiment, and variations and modifications may be made without departing from the scope of the present invention.

The present invention is based on Japanese priority application No. 10-165355, filed on Jun. 12, 1998, the entire contents of which are hereby incorporated by reference.

What is claimed is:

1. An optical-disc recording device which records information on and erases information from a re-recordable optical disc,
wherein said device is provided with means for, when overall erasing is performed on the optical disc, obtaining, from management information, a position of an area in which information has been recorded, performing an erasing operation on said area, and erasing said management information.

2. The optical-disc recording device, as claimed in claim 1, wherein said device is provided with means for, when an ending position of the area has not been recorded in the management information, performing a searching operation from a starting position of said area, finding an ending position of recorded information, and performing the erasing operation from said starting position of said area to said ending position of recorded information.

3. The optical-disc recording device as claimed in claim 1, wherein said device is provided with means for, when either no information has been recorded on the area or information has been only partially recorded on the area although a starting position and an ending position of said area have been recorded in the management information, searching said area and performing the erasing operation only on that part of said area on which the information has been recorded.

4. The optical-disc recording device, as claimed in claim 1, wherein said device is provided with means for searching all areas for which starting positions and ending positions have not been recorded in the management information, and, when information has been found as a result of the search being performed, performing the erasing operation on an area on which the found information has been recorded.

5. The optical-disc recording device, as claimed in claim 1, wherein said device is provided with means for searching a predetermined area immediately following a last area, a starting position and an ending position of which have been recorded in the management information, and, when information has been found as a result of the searching, performing the erasing operation on all the recording area of the optical disc.

* * * * *